Figure 1:
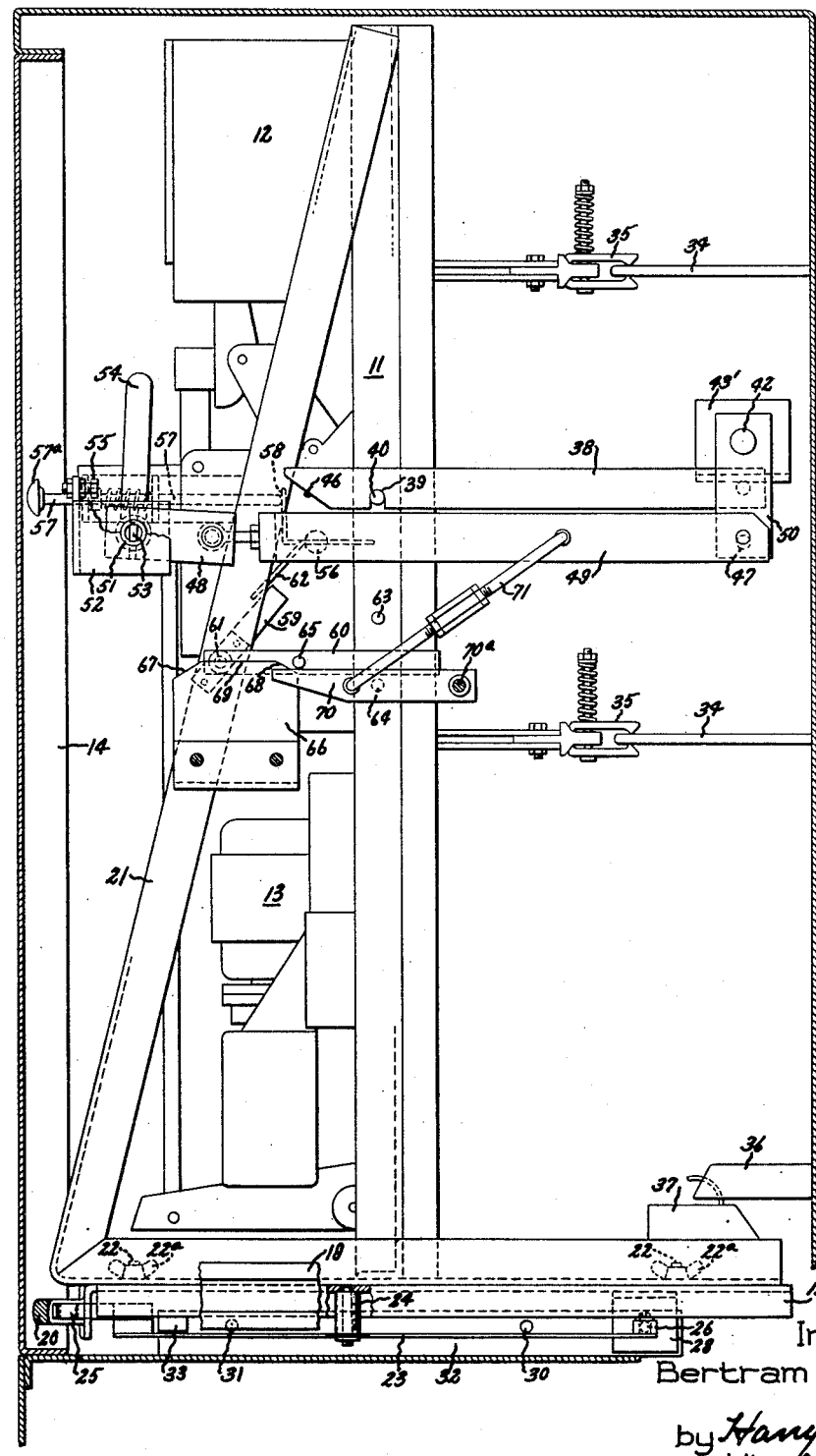

Feb. 10, 1942. B. W. MAHONEY 2,273,001
ELECTRIC SWITCHGEAR
Filed March 1, 1940 3 Sheets-Sheet 1

Inventor:
Bertram W. Mahoney,
by Harry E. Dunbar
His Attorney.

Feb. 10, 1942.  B. W. MAHONEY  2,273,001
ELECTRIC SWITCHGEAR
Filed March 1, 1940   3 Sheets-Sheet 2
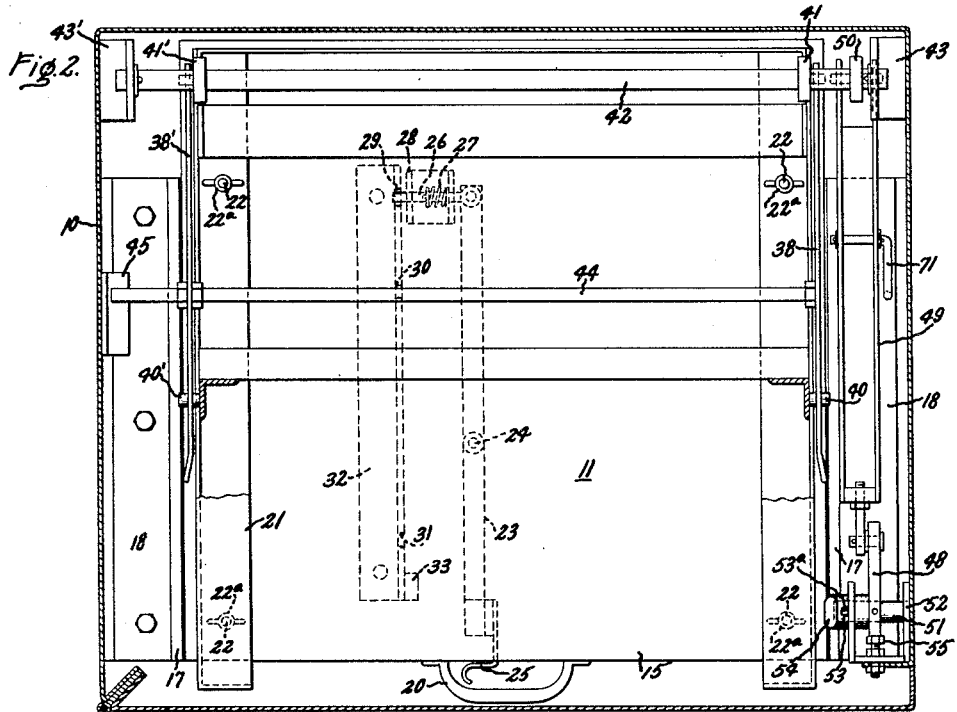
Fig. 2.
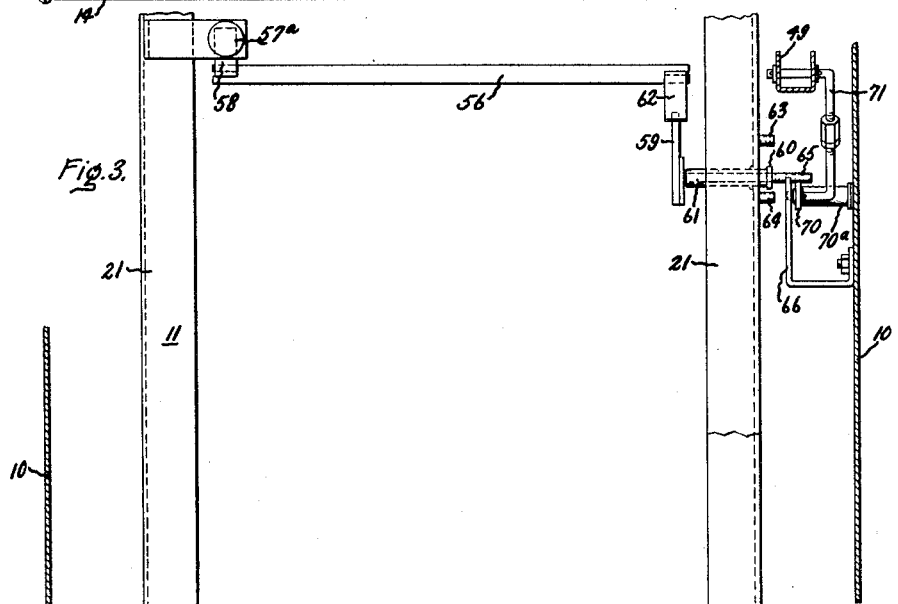
Fig. 3.
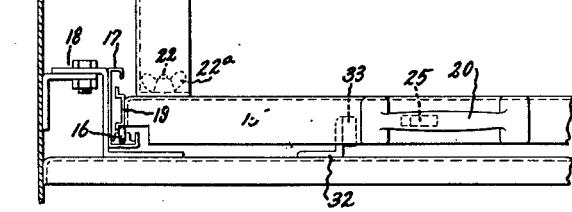
Inventor:
Bertram W. Mahoney,
by Harry E. Dunham
His Attorney.

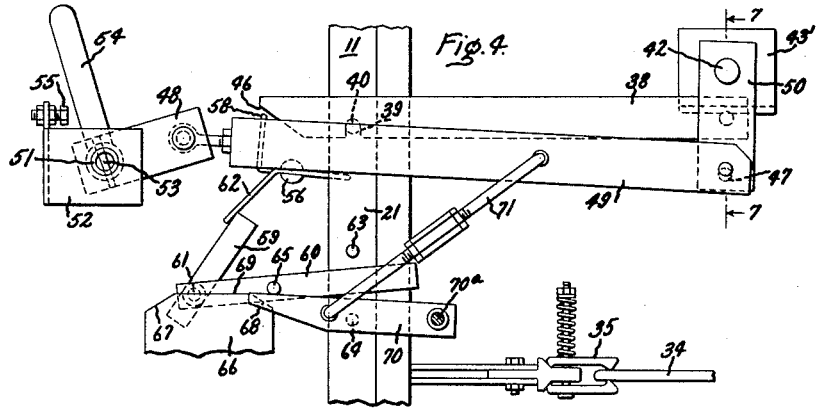

Patented Feb. 10, 1942

2,273,001

UNITED STATES PATENT OFFICE 2,273,001

ELECTRIC SWITCHGEAR

Bertram W. Mahoney, Drexel Hill, Pa., assignor to General Electric Company, a corporation of New York Application March 1, 1940, Serial No. 321,709

8 Claims. (Cl. 175—298)

My invention relates to electric switchgear and more particularly to metal-enclosed switchgear of the draw-out type wherein a rack-out mechanism is provided for producing relative movement between a metal enclosure and a removable unit including a circuit breaker.

In metal-enclosed switchgear of the draw-out type, the conventional arrangement comprises a stationary metal housing within which bus bars, cable leads, and accessory apparatus are disposed and a removable unit comprising a circuit breaker which is suitably connected to the busses and incoming or outgoing leads in the operative position of the unit. In this position, so-called primary disconnecting contacts comprising contacts connected to the busses and incoming and outgoing leads and fixedly mounted with respect to the stationary housing and coacting movable contacts carried by the removable unit are in engagement. The apparatus is also provided with suitable interlocking means generally arranged so that it is impossible to insert or withdraw the removable unit or break connection at the primary disconnecting contacts without first tripping the circuit breaker, and insuring that the circuit breaker is open both when the unit is moved out of and into operative position. Switchgear of the draw-out type is usually adapted to assume a plurality of positions in the metal-enclosed housing, one of which is a test position when the primary disconnecting contacts are disengaged and another a circuit-controlling position when the primary disconnecting contacts are engaged. In the former position, the operation of the circuit breaker may be tested.

Because of the resistance encountered between the cooperating contact members of the primary disconnecting devices when they are being engaged or disengaged, force-multiplying means are usually provided so that such engagement or disengagement may readily occur.

It is an object of my invention, therefore, to provide an improved metal-enclosed switchgear of the draw-out type which shall be simple and rugged in construction and efficient and safe in operation.

It is another object of my invention to provide a new and improved force-multiplying means for producing relative movement between the movable and stationary parts of electrical switchgear.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 is a side elevation partly in section of a metal-enclosed switchgear embodying my invention, Fig. 2 is a sectional plan view showing a portion of the apparatus in the circuit-controlling position illustrated in Fig. 1, Fig. 3 is a front elevational view showing only the tripping interlocks and the mounting of the draw-out type switchgear, Figs. 4, 5, and 6 are sectional elevations illustrating three successive positions of the rack-out mechanism while the primary disconnecting contacts are being disengaged, and Fig. 7 is a view taken on line 7—7 of Fig. 4.

Referring now to the drawings, I have illustrated a stationary housing 10 arranged in the form of a cubicle having sheet metal walls supported by a frame of angle members. This housing is open at the front to receive a removable unit 11 comprising a circuit breaker 12 and operating mechanism therefor generally indicated at 13 mounted so as to be movable horizontally into and out of said housing 10. The open front of the stationary housing 10 is closed by a suitable door 14.

The removable unit 11 of the switchgear includes a horizontally movable roll-out platform or shelf 15 arranged to be mounted slidably in shelf fashion on suitable rollers 16 mounted in a pair of channel guides 17. Each of the channel guides 17 is supported horizontally near the bottom of the side walls of housing 10 by suitable means 18. The pair of channel guides 17 cooperate with flanges 19, one of which is associated with each side of roll-out platform or shelf 15, and cooperate with rollers 16 so that roll-out shelf 15 is readily movable in a horizontal plane into and out of housing 10. A suitable handle 20 is attached by any suitable means to the front edge of roll-out platform or shelf 15 to facilitate operation thereof. In addition, the removable unit 11 includes circuit breaker 12 and operating mechanism 13 therefor which are vertically supported by a suitable framework 21 which is detachably mounted on roll-out shelf 15 by suitable means illustrated as comprising a plurality of bolts 22 provided with winged nuts 22a.

The roll-out shelf or platform 15 is also provided with a locking device to prevent it from being rolled in or out beyond the proper limits and also to hold it in a plurality of positions, such as the test position wherein the primary disconnecting contacts are disengaged so that the operation of the circuit breaker may be tested or the circuit-controlling position where the primary disconnecting devices are engaged. This locking device comprises a lever 23, Figs. 1 and 2, pivotally mounted at 24 to roll-out shelf 15 and provided with a manually operable catch lever 25 at one end thereof adjacent handle 20 and a pin 26 perpendicularly mounted with respect to the other end thereof. A suitable spring 27 cooperating with a U-shaped supporting member 28 also attached to roll-out shelf 15 normally biases the pin end of lever 23 in a counterclockwise direction with reference to Fig. 2 so as to force pin 26 into one of a plurality of openings 29, 30, or 31 in a suitable angle shaped stop member 32 fixedly mounted with respect to housing 10. When pin 26 projects into opening 29, as shown in Figs. 1 and 2, removable unit 11 is in the circuit-controlling position; when it projects into opening 30, the removable unit 11 is in the test position; and, when it projects into opening 31, the roll-out shelf 15 is in its withdrawn position. A suitable stop 33 attached to angle shaped member 32 cooperates with U-shaped supporting member 28 to prevent complete withdrawal of the roll-out shelf 15 from channel guides 17.

For the purposes of clearness and simplicity in the drawings, the bus bars, cable leads, feeders, and accessory apparatus are omitted in the stationary housing 10 and merely the stationary portion 34 of the primary disconnecting contacts is shown. These stationary contacts are suitably mounted in housing 10 and comprise a male type of contact adapted to engage with the spring pressed jaws of female type contact 35 associated with the removable unit 11. It will, of course, be understood by those skilled in the art that contacts 34 and 35 making up the primary disconnecting devices may be constructed in any other suitable way and the particular embodiment is only one of the many arrangements possible. The secondary or control connections for electrically operating the circuit breaker in the circuit-controlling position are schematically illustrated in Fig. 1 as comprising stationary contacts 36 associated with housing 10 and movable coacting contacts 37 associated with removable unit 11.

The rack-out mechanism or force-multiplying means for producing relative movement between housing 10 and removable unit 11 to effect engagement or disengagement of primary disconnecting devices comprising contacts 34 and 35 includes a pair of hooks 38 and 38', one mounted at either side of housing 10 having U-shaped notches 39 for engaging with pins 40 and 40', respectively, located on either side of framework 21 of removable unit 11. Pins 40 and 40' are located on a line midway between the upper and lower primary disconnecting devices comprising contacts 34 and 35, respectively, to insure that the removable unit is properly moved into and out of the circuit-controlling position and so that the force is applied at the optimum point. Hooks 38 and 38' have the inward ends thereof attached to suitable cranks 41 and 41', respectively, which in turn are fastened to a suitable shaft 42 rotatably mounted in supporting members 43 and 43', respectively, at the rear of stationary housing 10. The hooks 38 and 38' are approximately horizontal and are caused to move back and forth in housing 10 as shaft 42 is rotated. In order that these hooks 38 and 38' may move together, they are connected by a suitable crossbar 44, one end of which rests on a stop 45 (Fig. 2) secured to the side wall of housing 10. This stop regulates the position of hooks 38 and 38' which are provided with beveled ends 46 so that pins 40 and 40' attached to framework 21 pass under the beveled heads 46, lifting the hooks until the pins 40 and 40' are in a position to engage slots 39 and 39', respectively. Each of cranks 41 and 41' is provided with a pin 47 (Fig. 7) in the end thereof so that, at the end of the racking-out operation, these pins engage with their respective hooks 38 and 38' so that the latter are lifted to disengage notches 39 thereof from pins 40 and 40', respectively, best shown in Fig. 6, whereby the removable unit 11 is released from the rack-out mechanism.

The shaft 42 which operates the hooks 38 and 38' is rotatable through an angle somewhat greater than forty-five degrees by means of an adjustable toggle comprising a short link 48 and a long channel shaped link 49. One end of channel shaped link 49 is attached to crank 50 mounted on shaft 42 while the end of short link 48 is fixedly attached to a suitable shaft 51 mounted for rotation in U-shaped member 52 supported from the front of one of the side walls of housing 10. The end of shaft 51 is provided with a pin 53 which is arranged to cooperate with a removable handle 54 mounted at right angles with short link 48 and arranged to provide manual means for operating the rack-out mechanism. A suitable stop 55 is provided to limit the counterclockwise rotation of short link 48 with reference to Fig. 6, for example. When manual operating handle 54 is in its down position so that short link 48 is against stop 55, hooks 38 and 38' are in their farthest forward position and are raised by virtue of pins 47 so that the notches 39 thereof are disengaged from pins 40 and 40' associated with removable unit 11. The arrangement of the toggle comprising links 48 and 49 is such that the maximum mechanical advantage is obtained just at the time the primary disconnecting devices are being engaged which is the time when the maximum power is required. The power amplification of the force-multiplying means, as will be understood by those skilled in the art, is obtained by virtue of the toggle comprising links 48 and 49. This toggle also serves to lock the removable unit 11 into the circuit-controlling position since it is held in the over-center position by gravity, as shown in Fig. 1.

Interlocking of the circuit breaker 12 with respect to the frame of housing 10 and the rack-out mechanism is accomplished in the present instance by relating the circuit breaker tripping means to cam means carried by the frame of the stationary housing 10 and to the means for producing relative movement between the stationary and movable parts of the switchgear. The tripping mechanism of the circuit breaker, not shown, is arranged to be operated by several different means which rotate a tripping shaft 56 (Figs. 1 and 3) in the clockwise direction with reference to Fig. 1. A manually operable means for rotating tripping shaft 56 is provided comprising a spring-biased rod 57 having an operating handle 57a which is adapted to engage with an extension 58 on tripping shaft 56 whereby the operator may trip the circuit breaker 12 merely by pushing on handle 57a. Tripping shaft 56 is interlocked with the rack-out mechanism by means of a pair of levers 59 and 60 fixed to a pivotally mounted shaft 61 supported by the removable unit 11. Lever 59 is adapted to engage with an extension 62 of trip shaft 56 for causing clockwise rotation thereof whenever lever 60 is raised. The movement of lever 60 is limited by a pair of pins 63 and 64 mounted in the framework 21 of removable unit 11. Lever 60 is provided with a pin 65 which engages with a cam 66 secured to the inside wall of housing 10. This cam is provided with front and rear inclined surfaces 67 and 68, respectively, and a flat surface 69 so as to raise lever 65 and trip the circuit breaker 12 when removable unit 11 is pushed into housing 10 and thereafter hold the circuit breaker 12 in the tripped position until the removable unit 11 has reached the circuit-controlling position of the circuit breaker 12 whereby the latter may be closed In withdrawing removable unit 11 from housing 10 including circuit breaker 12, it must be tripped before the primary disconnecting devices comprising contacts 34 and 35 are disengaged. To accomplish this, a lever 70 is located in housing 10 and pivotally mounted to a side wall thereof at 70a so as to lift pin 65 and, consequently, levers 59 and 60 to accomplish tripping of circuit breaker 12. This lever 70 is interlocked with the rack-out mechanism by an adjustable rod 71 which is connected to the long channel shaped link 49 of the toggle of the rack-out mechanism. Thus, as the manually operable handle 54 is rotated in a counterclockwise direction with reference to Fig. 1 to disengage the primary disconnecting devices, the long link of the toggle 49 is raised rapidly, as shown in Fig. 4, pulling up lever 70 and thereby raising pin 65 to cause tripping of the circuit breaker 12 before the primary disconnecting devices comprising contacts 34 and 35 are disengaged. The flat surface 69 of cam 66, previously described, cooperates with pin 65 to maintain the circuit breaker in the tripped condition until the primary disconnecting contacts are disengaged and the circuit breaker reaches the test position, whereupon pin 65 may slide down the inclined surface 67 of cam 66.

The operation of the switchgear embodying my invention will be described first with reference to Fig. 1 wherein the removable unit 11 is in the circuit-controlling position with hooks 38 and 38' having the notches 39 thereof engaged with pins 40 and 40', respectively. The toggle comprising links 48 and 49 is in the overcenter position and held there by gravity so that the removable unit 11 is actually locked in this circuit-controlling position. If the operator now desires to disengage the primary disconnecting devices comprising contacts 34 and 35, he merely grasps handle 54 and rotates it in a counterclockwise direction. The short link 48 of the toggle causes the long link 49 to be raised very rapidly as in Fig. 4, whereupon lever 70 is raised as well as cooperating pin 45 causing tripping of the circuit breaker 12 before substantially any relative movement of the removable unit 11 in stationary housing 10 has occurred. Further movement of handle 54 will cause hooks 38 and 38' cooperating with pins 40 and 40' to produce movement of removable unit 11 and disengagement of the primary disconnecting devices, as shown in Fig. 5. Because of the toggle arrangement, considerable amplification of power is obtained. Still further counterclockwise rotation of manually operable handle 54 causes pins 47 mounted in the end of cranks 41 and 41' to engage with the under surface of hooks 38 and 38', respectively, whereby the latter are raised sufficiently to disengage notches 39 from pins 40 and 40', as shown in Fig. 6, so that removable unit 11 is free to be withdrawn from the rack-out mechanism. During all this time, cam 66 holds pin 65 in the upper position so that circuit breaker 12 must remain in the tripped condition. If the removable unit 11 is withdrawn sufficiently to reach the test position wherein pin 26 of the locking device engages with opening 30, then pin 65 of the tripping interlock mechanism will have moved down the inclined surface 67 of cam 66 so that the circuit breaker 12 may be operated in this position.

If it is desired to cause engagement of the pirmary disconnecting devices comprising contacts 34 and 35, the manually operable handle 54 is moved to the horizontal position of Fig. 5. The removable unit 11 mounted on roll-out shelf 15 is then pushed into housing 10 until pins 40 and 40' engaging with the beveled heads 46 of hooks 38 and 38' cause them to lift until hooks 40 and 40' engage with notches 39. Thereafter, clockwise rotation of handle 54 causes the rack-out mechanism to move the removable unit 11 including the circuit breaker 12 into the circuit-controlling position of Fig. 1 wherein the primary disconnecting devices are engaged and the interlock mechanism releases trip shaft 56 so that operation of the circuit breaker may be obtained. Furthermore, the toggle arrangement comprising links 48 and 49 being held in the overcenter position by gravity locks the removable unit in this position. It will be understood by those skilled in the art that, in view of the fastening means comprising bolts 22 and winged nuts 22a, the removable units 11 may be readily interchanged in so far as circuit breakers of different capacity are concerned. By this arrangement, therefore, one type of rack-out mechanism may be used interchangeably with removable units of like physical dimensions.

While I have shown and described a particular embodiment of my invention, I do not desire my invention to be limited to the construction shown and described for it will, of course, be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In an electric switchgear, the combination comprising a stationary housing, a separate movable structure including a circuit breaker mounted thereon arranged to be moved into and out of a circuit-controlling position in said housing, primary disconnecting devices having cooperating members carried by said housing and said movable structure, means for effecting engagement and disengagement of said primary disconnecting devices comprising a hook member and a cooperating pin member engageable by said hook member, one of said members being associated with said stationary housing while the other of said members is associated with said movable structure, force-multiplying means mounted substantially at the line of force of said primary disconnecting devices relative to said movable structure comprising a toggle mechanism for operating said last-mentioned means, and means for automatically disengaging said hook member from said pin member at the end of the disengaging operation of said primary disconnecting devices.

2. In an electric switchgear, the combination comprising a stationary housing, a separate movable structure including a circuit breaker mounted thereon arranged to be moved into and out of circuit-controlling position in said housing, primary disconnecting devices having cooperating members carried by said housing and said movable structure, means for effecting engagement and disengagement of said primary disconnecting devices comprising a hook member mounted for reciprocal movement and a cooperating pin member engageable by said hook member, one of said members being associated with said stationary housing while the other of said members is associated with said movable structure, said members being mounted substantially at the line of force of said primary disconnecting devices relative to said movable structure, and means for reciprocating said hook member when it has engaged said pin member to produce relative movement between said housing and said movable structure.

3. In an electric switchgear, the combination comprising a stationary housing, a separate movable structure including a circuit breaker mounted thereon arranged to be moved horizontally into and out of a circuit-controlling position in said housing, primary disconnecting devices having cooperating members carried by said housing and said movable structure, means for effecting engagement and disengagement of said primary disconnecting devices comprising a pair of hooks associated with said stationary housing for engaging cooperating pins associated with said movable structure, force-multiplying means mounted substantially at the line of force of said primary disconnecting devices relative to said movable structure comprising a toggle mechanism for operating said last-mentioned means, means for automatically lifting said hooks from said pins at the end of the disengaging operation of said primary disconnecting devices, and means for insuring the tripped condition of said circuit breaker while said primary disconnecting devices are being engaged or disengaged.

4. In an electric switchgear, the combination comprising a stationary housing, a separate movable structure including a circuit breaker mounted thereon arranged to be moved horizontally into and out of a circuit-controlling position in said housing, primary disconnecting devices having cooperating members carried by said housing and said movable structure, means for effecting engagement and disengagement of said primary disconnecting devices comprising a hook and cooperating pin member, means for producing reciprocal movement of said hook whereby relative movement between said movable structure and said housing is obtained, said hook being mounted horizontally at the line of force of said primary disconnecting devices relative to said movable structure, and means for insuring the tripped condition of said circuit breaker while said primary disconnecting devices are being engaged or disengaged.

5. In an electric switchgear, the combination comprising a stationary housing, a separate movable structure including a circuit breaker mounted thereon arranged to be moved into and out of a circuit-controlling position in said housing, primary disconnecting devices having cooperating members carried by said housing and said movable structure, and force-multiplying means mounted substantially at the line of force of said primary disconnecting devices relative to said movable structure for effecting engagement and disengagement of said primary disconnecting devices including a toggle mechanism for amplifying the power applied to produce relative movement between said stationary housing and said movable structure.

6. In an electric switchgear, the combination comprising a stationary housing, a separate movable structure including a circuit breaker mounted thereon arranged to be moved horizontally into and out of a circuit-controlling position in said housing, primary disconnecting devices having cooperating members carried by said housing and said movable structure, force-multiplying means for effecting engagement and disengagement of said primary disconnecting devices comprising a pair of hooks for engaging cooperating pins, and a toggle mechanism associated with said hooks for amplifying the power applied to produce relative movement between said stationary housing and said movable structure, said toggle mechanism being so constructed and arranged as to be held in the overcenter position by gravity when said primary disconnecting devices are engaged so as to lock said movable structure in said circuit-controlling position.

7. In an electric switchgear, the combination comprising a stationary housing, a separate movable structure including a movable platform with a circuit breaker mounted thereon arranged to be moved horizontally into and out of a circuit-controlling position in said housing, primary disconnecting devices having cooperating members carried by said housing and said movable structure, force-multiplying means for effecting engagement and disengagement of said primary disconnecting devices including a toggle mechanism for amplifying the power applied to produce relative movement between said stationary housing and said movable structure, and means for readily removing said circuit breaker from said movable platform so that it may be interchanged with a circuit breaker of like physical dimensions.

8. In an electric switchgear, the combination comprising a stationary housing, a separate movable structure including a circuit breaker mounted thereon arranged to be moved into and out of circuit-controlling position in said housing, primary disconnecting devices having cooperating members carried by said housing and said movable structure, force-multiplying means for effecting engagement and disengagement of said primary disconnecting devices comprising a hook member for engaging a cooperating pin member, one of said members being associated with said stationary housing while the other of said members is associated with said movable structure, and a toggle mechanism associated with said hook member for amplifying the power supplied to produce relative movement between said stationary housing and said movable structure, said toggle mechanism being so constructed and arranged as to be held in the overcenter position by gravity when said primary disconnecting devices are engaged so as to lock said movable structure in said circuit-controlling position.

BERTRAM W. MAHONEY.